United States Patent
Koo

(10) Patent No.: US 10,341,816 B2
(45) Date of Patent: Jul. 2, 2019

(54) METHOD AND APPARATUS OF RECOGNIZING LOCATION OF USER DEVICE

(71) Applicant: LOPLAT CO., LTD., Seoul (KR)

(72) Inventor: Ja Hyoung Koo, Seoul (KR)

(73) Assignee: LOPLAT CO., LTD., Gangnam-Gu Seoul (KR)

(*) Notice: Subject to any disclaimer, the term of this patent is extended or adjusted under 35 U.S.C. 154(b) by 0 days.

(21) Appl. No.: 15/980,093

(22) Filed: May 15, 2018

(65) Prior Publication Data

US 2018/0262879 A1 Sep. 13, 2018

Related U.S. Application Data

(63) Continuation of application No. PCT/KR2018/002339, filed on Feb. 26, 2018.

(30) Foreign Application Priority Data

Mar. 7, 2017 (KR) .................. 10-2017-0028711
Mar. 17, 2017 (KR) .................. 10-2017-0033668

(51) Int. Cl.
*H04W 4/02* (2018.01)
*H04W 4/33* (2018.01)
*G01S 5/00* (2006.01)
*H04W 84/12* (2009.01)

(52) U.S. Cl.
CPC ............ *H04W 4/023* (2013.01); *H04W 4/33* (2018.02); *G01S 5/00* (2013.01); *H04W 84/12* (2013.01)

(58) Field of Classification Search
CPC ....... H04W 4/021; H04W 4/043; H04W 4/80; H04W 4/023; H04W 4/029; H04W 4/04; H04W 84/12; G01S 5/0252
See application file for complete search history.

(56) References Cited

U.S. PATENT DOCUMENTS

2016/0080911 A1* 3/2016 Kay .................. H04W 4/04
455/456.1

FOREIGN PATENT DOCUMENTS

| KR | 100994840 | 11/2010 |
| KR | 20110055897 | 5/2011 |
| KR | 101616720 | 5/2016 |
| KR | 20160098608 | 8/2016 |
| KR | 101707982 | 2/2017 |
| WO | 2017003094 | 1/2017 |

* cited by examiner

*Primary Examiner* — Nam T Huynh
(74) *Attorney, Agent, or Firm* — Cantor Colburn LLP

(57) ABSTRACT

Provided is a method and apparatus of recognizing a location of a user device, and the method of recognizing a location of a user device. The method includes receiving a device signal fingerprint from a user device, calculating similarities between the device signal fingerprint and reference signal fingerprints collected inside a store and stored in a database in association with store information, and determining whether the user device is located inside or outside the store on the basis of the similarities.

16 Claims, 8 Drawing Sheets

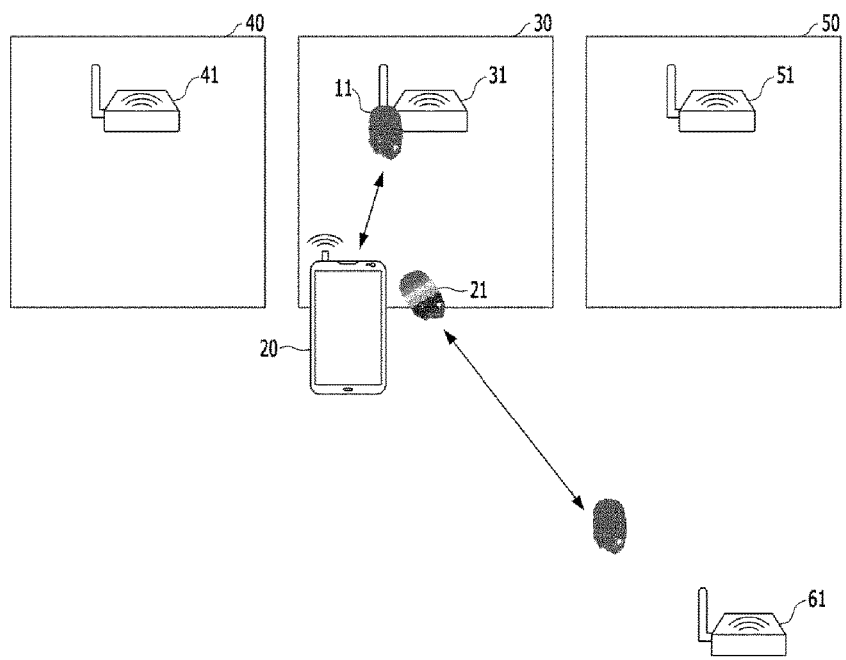

METHOD AND APPARATUS OF RECOGNIZING LOCATION OF USER DEVICE

TECHNICAL FIELD

The present disclosure relates to a method and apparatus of recognizing a location of a user device and a method and apparatus of updating store information.

BACKGROUND

Location-based service (LBS) technology has been developed based on various infrastructures for location determination through the development of mobile communication technology and the enhancement of location determination technology. Particularly, an LBS has received a lot of attention as a main application service in the field of mobile communication owing to free open GPS technology and political support from all over the world.

It is crucial to obtain location information of a device in order to provide the LBS. Conventionally, location information of a device has been obtained by a method using GPS satellites, a method using mobile communication environment, and a method using proximity to an immovable object such as wireless LAN. These methods are capable of obtaining relatively accurate location information outdoors but have the disadvantage of being unable to be used in areas where signals are greatly diminished, such as indoors or underground.

Further, in recent years, technologies of detecting a location of a user device and providing various services relating to stores or restaurants around the user device have been utilized. In order to implement these technologies, a user's visit to a store needs to be accurately recognized. However, due to the above-described disadvantage, it is still difficult to accurately detect a location of the user.

Technologies of detecting a location of a user device and providing various services relating to stores or restaurants around the user device have been utilized. In order to implement these technologies, a user's visit to a store needs to be accurately recognized. However, due to the above-described disadvantage, it is still difficult to accurately detect a location of the user.

Further, a conventional technology of recognizing a location of a user device is based on GPS signals, mobile communication signals, etc. and specifies a location with the highest signal value or a greatest difference in similarity with a reference signal as a location of a user device or uniformly applies a reference value for similarity comparison with a reference signal to all stores to uniformly specify a location of a user device regardless of characteristics of the stores, and, thus, has low accuracy. Further, the conventional technology of recognizing a location of a user device can specify information indicating that the user device is near specific store or specify nearest store information but cannot accurately recognize that the user device is actually located inside a specific store.

Furthermore, in recent years, the cycle of changes in commercial area has been decreased, which has caused frequent changes in wireless network environment of the commercial area. Such changes in wireless network environment cause degradation in the performance of recognizing a position of a device. Also, in the case where service information is provided to a user on the basis of previously recorded location information of stores, inaccurate information such as information about a closed-down store may be provided due to the absence of updates according to changes in commercial area. Further, actually, it is very difficult to manually check information about a large number of stores distributed across the nation/world or revisit the stores in person to update changes in store information and environment around the stores.

The background technology of the present disclosure is disclosed in Korean Patent No. 10-1707982 (registered on Feb. 13, 2017).

DISCLOSURE OF THE INVENTION

Problems to be Solved by the Invention

The present disclosure is conceived to solve the above-described problem of the conventional technology and provides a location recognizing method and apparatus which can recognize a location of a user device.

Further, the present disclosure is conceived to solve the above-described problem of the conventional technology and provides a location recognizing method and apparatus which can accurately specify a location of a user device as being inside or outside a store on the basis of signal fingerprints received from each store and the user device near the store.

Furthermore, the present disclosure is conceived to solve the above-described problem of the conventional technology and provides a location recognizing method and apparatus which can accurately detect a location of a user device to be suitable for characteristics of each store by generating a reference value for determining a location of a user device for each store in consideration of the characteristics of each store.

The present disclosure is conceived to solve the above-described problem of the conventional technology and provides an updating method and apparatus which can accurately specify a location of a user device as being inside or outside a store on the basis of signal fingerprints received from each store and the user device near the store and automatically update store information on the basis of the result thereof.

The present disclosure is conceived to solve the above-described problem of the conventional technology and provides a store information updating method and apparatus which can recognize a change in wireless network environment in or around a store on the basis of a signal fingerprint for a user device determined as being inside the store and update store information according to the changed environment.

However, problems to be solved by the present disclosure are not limited to the above-described problems. There may be other problems to be solved by the present disclosure.

Means for Solving the Problems

As a technical means for solving the above-described technical problems, a method of recognizing a location of a user device according to an embodiment of the present disclosure may include receiving a device signal fingerprint from a user device, calculating similarities between the device signal fingerprint and reference signal fingerprints collected inside a store and stored in a database in association with store information, and determining whether the user device is located inside or outside the store on the basis of the similarities.

According to an embodiment of the present disclosure, the method of recognizing a location may further include setting a reference value for determining the inside or the outside of the store, and in the determining, the similarity and the reference value may be compared and if the similarity is equal to or higher than the reference value, the user device may be determined as being inside the store.

According to an embodiment of the present disclosure, the reference signal fingerprints may be stored in the database for respective multiple stores, and in the setting of the reference value, reference values for the respective multiple stores may be set on the basis of the reference signal fingerprints for the respective multiple stores.

According to an embodiment of the present disclosure, in the calculating of the similarity, similarities between the device signal fingerprint and the reference signal fingerprints for the respective multiple stores may be calculated.

According to an embodiment of the present disclosure, the determining may include comparing a first similarity which is the highest similarity among the similarities between the device signal fingerprint and the reference signal fingerprints for the respective multiple stores with a reference value for a first store associated with a reference signal fingerprint corresponding to the first similarity, and determining the user device as being inside the first store if the first similarity is equal to or higher than the reference value for the first store.

According to an embodiment of the present disclosure, the determining may include determining whether the similarities between the device signal fingerprint and the reference signal fingerprints for the respective multiple stores are equal to or higher than the reference values for the respective multiple stores, and determining the user device as being inside a first store associated with a reference signal fingerprint corresponding to a first similarity which is the highest similarity among similarities equal to or higher than the reference values for the respective multiple stores.

According to an embodiment of the present disclosure, the device signal fingerprint may include at least one set of a basic service set identifier (BSSID) of an access point adjacent to the user device and information about a wireless signal strength between the user device and the access point, and the reference signal fingerprint may include at least one set of a BSSID of an access point adjacent to the store and information about a wireless signal strength between the store and the access point.

According to an embodiment of the present disclosure, in the setting of the reference value, the reference value may be set on the basis of the wireless signal strength included in the device signal fingerprint and the wireless signal strength included in the reference signal fingerprint.

According to an embodiment of the present disclosure, the setting of the reference value may include receiving an internal signal fingerprint collected from a region inside the store, receiving an external signal fingerprint collected from a region outside the store, calculating an internal similarity between the device signal fingerprint and the internal signal fingerprint, calculating an external similarity between the device signal fingerprint and the external signal fingerprint, and setting any one of inter-values between the internal similarity and the external similarity as the reference value.

According to an embodiment of the present disclosure, the method of recognizing a location may further include receiving an external signal fingerprint collected from a region outside the store, and calculating a similarity between the device signal fingerprint and the external signal fingerprint, and in the determining, if the similarity between the reference signal fingerprint and the device signal fingerprint is higher than the similarity between the device signal fingerprint and the external signal fingerprint, the user device may be determined as being inside the store.

According to an embodiment of the present disclosure, the method of recognizing a location may further include recording a similarity between a reference signal fingerprint and a device signal fingerprint which corresponds to the case where the user device is determined as being inside the store in the database, and in the setting of the reference value, top n number of similarities among similarities recorded in the database may be averaged and the reference value may be set in consideration of the average of the similarities and a store characteristic coefficient.

According to an embodiment of the present disclosure, in the calculating of the similarity, the similarity is calculated on the basis of whether BSSIDs included in the reference signal fingerprint and the device signal fingerprint are superimposed with each other, and if a BSSID is included in only one of the reference signal fingerprint and the device signal fingerprint, a wireless signal strength with a minimum value in association with the BSSID may be assigned to the other to calculate a similarity.

An apparatus of recognizing a location of a user device according to an embodiment of the present disclosure may include a receiving unit configured to receive a device signal fingerprint from a user device, a database configured to store reference signal fingerprints collected inside a store in association with store information, a calculation unit configured to calculate similarities between the device signal fingerprint and the reference signal fingerprints, and a determination unit configured to determine whether the user device is located inside or outside the store on the basis of the similarities.

According to an embodiment of the present disclosure, the apparatus of recognizing a location may further include a setting unit configured to set a reference value for determining the inside or the outside of the store, and the determination unit may compare the similarity and the reference value and if the similarity is equal to or higher than the reference value, the determination unit may determine that the user device is inside the store.

According to an embodiment of the present disclosure, the reference signal fingerprints may be stored in the database for respective multiple stores, and the setting unit may set reference values for the respective multiple stores on the basis of the reference signal fingerprints for the respective multiple stores.

According to an embodiment of the present disclosure, the calculation unit may calculate similarities between the device signal fingerprint and the reference signal fingerprints for the respective multiple stores, and the determination unit may compare a first similarity which is the highest similarity among the similarities between the device signal fingerprint and the reference signal fingerprints for the respective multiple stores with a reference value for a first store associated with a reference signal fingerprint corresponding to the first similarity and determine the user device as being inside the first store if the first similarity is equal to or higher than the reference value for the first store.

According to an embodiment of the present disclosure, the calculation unit may compare similarities between the device signal fingerprint and the reference signal fingerprints for the respective multiple stores, and the determination unit may determine whether the similarities between the device signal fingerprint and the reference signal fingerprints for the respective multiple stores are equal to or higher than the reference values for the respective multiple stores and determine the user device as being inside a first store associated with a reference signal fingerprint corresponding to a first similarity which is the highest similarity among similarities equal to or higher than the reference values for the respective multiple stores.

According to an embodiment of the present disclosure, the device signal fingerprint may include at least one set of a basic service set identifier (BSSID) of an access point adjacent to the user device and information about a wireless signal strength between the user device and the access point, and the reference signal fingerprint may include at least one set of a BSSID of an access point adjacent to the store and information about a wireless signal strength between the store and the access point, and the setting unit may set the reference value on the basis of the wireless signal strength included in the device signal fingerprint and the wireless signal strength included in the reference signal fingerprint.

According to an embodiment of the present disclosure, the receiving unit may receive an internal signal fingerprint collected from a region inside the store and receive an external signal fingerprint collected from a region outside the store, and the calculation unit may calculate an internal similarity between the device signal fingerprint and the internal signal fingerprint and an external similarity between the device signal fingerprint and the external signal fingerprint, and the setting unit may set any one of inter-values between the internal similarity and the external similarity as the reference value.

According to an embodiment of the present disclosure, the receiving unit may receive an external signal fingerprint collected from a region outside the store, and the calculation unit may calculate an external similarity between the device signal fingerprint and the external signal fingerprint, and if the similarity between the reference signal fingerprint and the device signal fingerprint is higher than the similarity between the device signal fingerprint and the external signal fingerprint, the determination unit may determine that the user device is inside the store.

According to an embodiment of the present disclosure, the database may record a similarity between a reference signal fingerprint and a device signal fingerprint which corresponds to the case where the user device is determined as being inside the store, and the setting unit may average top n number of similarities among similarities recorded in the database and set the reference value in consideration of the average of the similarities and a store characteristic coefficient.

According to an embodiment of the present disclosure, the calculation unit may calculate the similarity on the basis of whether BSSIDs included in the reference signal fingerprint and the device signal fingerprint are superimposed with each other, and if a BSSID is included in only one of the reference signal fingerprint and the device signal fingerprint, a wireless signal strength with a minimum value in association with the BSSID may be assigned to the other to calculate a similarity.

The above-described embodiments are provided by way of illustration only and should not be construed as liming the present disclosure. Besides the above-described embodiments, there may be additional embodiments described in the accompanying drawings and the detailed description.

Effects of the Invention

According to the above-described means for solving the problems, it is possible to provide a location recognizing method and apparatus which can recognize whether a user device is located inside or outside a store.

According to the above-described means for solving the problems, it is possible to accurately detect a location of a user device to be suitable for characteristics of each store by generating a reference value for determining a location of a user device for each store in consideration of the characteristics of each store.

According to the above-described means for solving the problems, it is possible to provide a location recognizing method and apparatus which can recognize a location of a user device on the basis of wireless signal strength information of a signal transmitted from an access point.

According to the above-described means for solving the problems, it is possible to provide an updating method and apparatus which can accurately specify a location of a user device as being inside or outside a store on the basis of signal fingerprints received from each store and the user device near the store and automatically update store information on the basis of the result thereof.

According to the above-described means for solving the problems, it is possible to provide a store information updating method and apparatus which can recognize a change in wireless network environment in or around a store on the basis of a signal fingerprint for a user device determined as being inside the store and update store information according to the changed environment.

BRIEF DESCRIPTION OF THE DRAWINGS

FIG. 5 is a diagram illustrating a third embodiment for recognizing a location of a user device according to an embodiment of the present disclosure;

FIG. 6 is a diagram illustrating an example of a fingerprint according to an embodiment of the present disclosure;

BEST MODE FOR CARRYING OUT THE INVENTION

Figure 1:
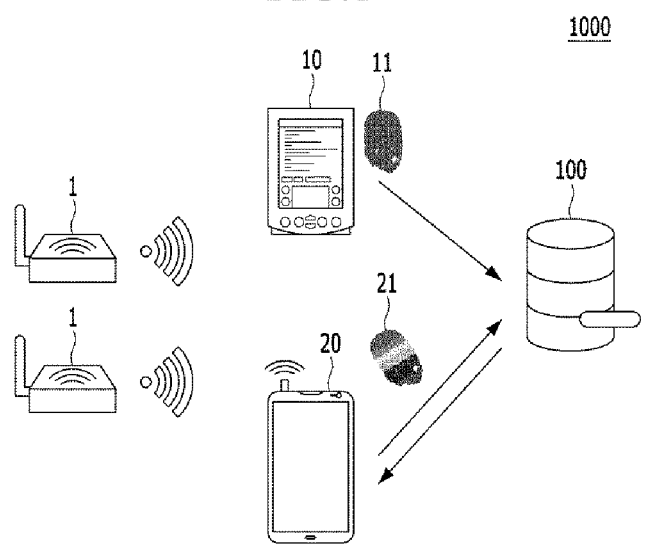
FIG. 1 is a diagram schematically illustrating a configuration of a location recognizing system for a user device according to an embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the terms "on", "above", "on an upper end", "below", "under", and "on a lower end" that are used to designate a position of one element with respect to another element include both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

It is assumed that the following embodiments are applied to communication systems such as WiFi, Bluetooth, etc. The following embodiments can also be applied to mobile communication systems such as LTE, LTE-A, etc.

FIG. 1 is a diagram schematically illustrating a configuration of a location recognizing system for a user device according to an embodiment of the present disclosure.

Referring to FIG. 1, a location recognizing system 1000 for a user device may include a location recognizing apparatus 100, a signal fingerprint measurement device 10, and a user device 20. According to an embodiment of the present disclosure, the signal fingerprint measurement device 10 may be installed inside a specific store and configured to receive a signal transmitted from at least one access point 1 adjacent to the store and collect a reference signal fingerprint 11 from the received signal. Further, the user device 20 may receive a signal transmitted from the access point 1 adjacent to the user device 20 and collect a device signal fingerprint 21 from the received signal. For example, a signal transmitted from the access point 1 may be a WiFi signal.

The signal fingerprint measurement device 10 and the user device 20 are linked to the access point 1 and the location recognizing apparatus 100 through a network, and may include, for example, all kinds of wireless communication devices such as Smartphone, SmartPad, tablet PC and PCS (Personal Communication System), GSM (Global System for Mobile communication), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) devices, and immobile devices such as desktop computer and smart TV. Further, the location recognizing apparatus 100 may include any type of device, such as a server, a computer, a notebook computer, and a cloud database, capable of storing and calculating data.

Further, the signal fingerprint measurement device 10 and the user device 20 may receive a signal transmitted from the access point 1 through the network and may transmit the reference signal fingerprint 11 or the device signal fingerprint 21 to the location recognizing apparatus 100 through the network. The network refers to a wired or wireless connection structure that enables information exchange between nodes such as devices, servers, etc. Examples of the network may include a WiFi network, a 3GPP (3rd Generation Partnership Project) network, an LTE (Long Term Evolution) network, a 5G network, a WIMAX (World Interoperability for Microwave Access) network, the Internet, a Wireless LAN (Wireless Local Area Network), a WAN (Wide Area Network), a PAN (Personal Area Network), a Bluetooth network, a Zigbee network, a satellite broadcasting network, an analog broadcasting network, a DMB (Digital Multimedia Broadcasting) network, and the like, but are not limited thereto.

According to an embodiment of the present disclosure, the location recognizing apparatus 100 may receive multiple reference signal fingerprints 11 from multiple signal fingerprint measurement devices 10. Further, the location recognizing apparatus 100 may receive the device signal fingerprint 21 from the user device 20. Each of the reference signal fingerprints 11 and the device signal fingerprint 21 may include a basic service set identifier (BSSID) of the adjacent access point 1 and a received signal strength (RSS) transmitted from the access point 1. Further, the reference signal fingerprint 11 and the device signal fingerprint 21 may include a media access control (MAC) address of an adjacent Bluetooth communication device (not illustrated).

More specifically, the signal fingerprint measurement device 10 and the user device 20 may receive identification information from an external device such as the adjacent access point 1 or Bluetooth communication device. The identification information may include the MAC address of the Bluetooth communication device or the BSSID of the access point 1. Each of the MAC address and the BSSID may have a length of 48 bits for a unique identification value of the Bluetooth communication device and the access point 1. Specifically, the MAC address may refer to an address used by the Bluetooth communication device in a MAC layer, and the BSSID may refer to an identifier for identifying a basic service set (BSS) which is a basic building block in a WiFi system.

The signal fingerprint measurement device 10 and the user device 20 may pick up beacon signals regularly broadcast by the Bluetooth communication device or the access point 1 and decode identification information from the picked-up beacon signals. Otherwise, the signal fingerprint measurement device 10 and the user device 20 may transmit a probe request frame for discovery of the Bluetooth communication device or the access point 1 and then decode identification information from a probe response frame received from the Bluetooth communication device or the access point 1 in response to the probe request frame.

Further, the signal fingerprint measurement device 10 and the user device 20 may measure a wireless signal strength (Received Signal Strength (RSS)) of each device on the basis of frames received from the Bluetooth communication device and the access point 1.

The signal fingerprint measurement device 10 and the user device 20 that received the identification information from the Bluetooth communication device or the access point 1 may transmit the reference signal fingerprint 11 and the device signal fingerprint 21 including identification information and an RSS to the location recognizing apparatus 100. Hereinafter, it will be described that a BSSID of an access point is included as the identification information.

The reference signal fingerprint 11 and the device signal fingerprint 21 may include BSSID of the adjacent access point 1 and RSS information of a signal transmitted from the access point 1 as a set and may include multiple sets corresponding to multiple access points, respectively. BSSIDs included in the reference signal fingerprint 11 and the device signal fingerprint 21 may vary depending on an access point adjacent to the signal fingerprint measurement device 10 and the user device 20.

Meanwhile, two access points 1 are illustrated in the drawing. There may be multiple access points 1, and the signal fingerprint measurement device 10 and the user device 20 may receive signals from the multiple access points.

The location recognizing apparatus 100 may store the reference signal fingerprint 11 received from the signal fingerprint measurement device 10 in a database. For example, the location recognizing apparatus 100 may store reference signal fingerprints for respective multiple stores collected by the signal fingerprint measurement devices 10 in the respective multiple stores in association with store information (e.g., store names) of the respective stores.

Further, the location recognizing apparatus 100 may store visit recognition patterns for the respective stores in the database. For example, a visit recognition pattern may include similarities between respective device signal fingerprints 21 and the reference signal fingerprint 11 in the case where multiple user devices are recognized as being inside a store. Further, the visit recognition pattern may include daily visit count information corresponding to the case where multiple user devices are recognized as being inside respective stores for a predetermined period of time (e.g., for a day).

Further, the location recognizing apparatus 100 may calculate a similarity between the device signal fingerprint 21 received from the user device 20 and the stored reference signal fingerprint 11. Further, the location recognizing apparatus 100 may calculate similarities between the reference signal fingerprint 11 and device signal fingerprints 21 of multiple user devices and determine whether each of the multiple user devices are located inside the store on the basis of the similarities. When a similarity is calculated, various metrics for calculating a similarity between two vectors may be used. Examples of calculation of vector similarity may include Cosine Similarity, Tanimoto Coefficient Similarity, Euclidean Distance, Correlation, Chebyshev distance, Mahalanobis distance, Manhattan distance, or Hamming distance.

For example, the location recognizing apparatus 100 may calculate a similarity using the following Equation 1 on the basis of the Cosine Similarity method, the Tanimoto Similarity method, and the Euclidean Distance-based method.

$$\text{Similarity} = e*j(S,A) + f*k(S,A) + g*l(S,A) \quad \text{[Equation 1]}$$

Herein, S represents a reference signal fingerprint and A represents a device signal fingerprint. Further, j(S, A) represents a Cosine coefficient, k(S, A) represents a Tanimoto coefficient, and l(S, A) represents a Euclidean coefficient. Herein, e, f, and g are weightings which vary depending on characteristics of a store, characteristics of a user device, the amount of reference records stored in a database, and the environment around the store.

For example, a Cosine Similarity can be calculated by the following Equation 2.

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}} \quad \text{[Equation 2]}$$

For example, in Equation 2, A represents a vector formed on the basis of the device signal fingerprint 21 and B represents a vector formed on the basis of the reference signal fingerprint 11 registered in the database. Each of the vectors may be formed by various methods capable of comparing RSSs having the same BSSID.

For another example, the location recognizing apparatus 100 may calculate a similarity between the reference signal fingerprint 11 and the device signal fingerprint 21 on the basis of a superimposition ratio of identification information included in the reference signal fingerprint 11 and the device signal fingerprint 21. A similarity between the device signal fingerprint 21 and a reference signal fingerprint for a store A may be determined depending on a superimposition ratio between BSSIDs included in the device signal fingerprint 21 and BSSIDs included in the reference signal fingerprint for the store A (based on the number of BSSIDs of the device signal fingerprint 21). For another example, the location recognizing apparatus 100 may determine similarities between the device signal fingerprint 21 and reference signal fingerprints for respective stores depending on a superimposition ratio between BSSIDs included in the reference signal fingerprints for the respective stores registered in the database and BSSIDs included in the device signal fingerprint 21 (based on the number of BSSIDs of the reference signal fingerprint 21).

In addition to the above-described method, the publicly known methods can be applied to the calculation of a similarity in various ways, and, thus, a detailed explanation thereof will be omitted.

The similarity obtained by Equation 1 outputs a result value in the range of 0 to 1 as a similarity between two samples. A result value closer to 1 indicates a higher similarity between two samples.

The location recognizing apparatus 100 may calculate a similarity on the basis of whether or not BSSIDs included in a reference signal fingerprint and a device signal fingerprint are superimposed. For example, the location recognizing apparatus 100 may calculate a similarity in consideration of a signal strength of a BSSID included in both the reference signal fingerprint 11 and the device signal fingerprint 21, and if a BSSID is included in only one of the reference signal fingerprint and the device signal fingerprint, an RSS with a minimum value (e.g., −91 dB) in association with the BSSID may be assigned to the other to calculate a similarity. A similarity is calculated on the basis of BSSIDs superimposed with each other and a signal strength minimum value is assigned to BSSIDs not superimposed with each other, and, thus, it is possible to more accurately calculate a similarity between the reference signal fingerprint 11 and the device signal fingerprint 21.

The reason why an RSS with a minimum value is assigned is to suppress the omission of calculation of a similarity between BSSIDs which are superimposed with each other. There are not many superimposed BSSIDs. Thus, even if a reference signal fingerprint and a device signal fingerprint are not similar to each other, non-superimposed BSSIDs are not considered for the calculation of a similarity. Therefore, a relatively high similarity can be calculated. As a result, an inaccurate result may also be produced. Accordingly, by assigning a minimum value to the non-superimposed BSSIDs, a penalty may be given for non-superimposition. That is, when the reference signal fingerprint 11 and the device signal fingerprint 21 are compared in similarity, a similarity is calculated assuming that non-superimposed wireless signals are scanned with a constant value, and, thus, a proper penalty may be given to non-scanned signals.

Since the location recognizing apparatus 100 calculates similarities between the device signal fingerprint 21 and the reference signal fingerprints 11 for all of stores stored in the database, the calculation result of similarity may be produced corresponding to the number of the stored reference signal fingerprints 11.

Further, the location recognizing apparatus 100 may determine whether the user device 20 is located inside or outside the store on the basis of the similarity. In this case, the location recognizing apparatus 100 may set a reference value for determining the inside or the outside of the store. For example, the location recognizing apparatus 100 may set reference values for respective multiple stores on the basis of the reference signal fingerprints 11 for the respective multiple stores.

The location recognizing apparatus 100 may set a reference value in various ways. For example, the location recognizing apparatus 100 may set a reference value on the basis of the RSS included in the device signal fingerprint 21 and the RSS included in the reference signal fingerprint 11. The location recognizing apparatus 100 may set a reference value using the following Equation 3.

$$\text{Reference value} = a*f(S) + b*g(S) + c*h(S) + a'*f(A) + b'*g(A) + c'*h(A) \quad \text{[Equation 3]}$$

Herein, $f(S)$ represents a reference generating function using the sum of RSSs included in a reference signal fingerprint, $g(S)$ represents a reference generating function using the average of RSSs included in the reference signal fingerprint, and $h(S)$ represents a reference generating function using a variation between reference signal fingerprints. Further, $f(A)$ represents a reference generating function using the sum of RSSs included in a device signal fingerprint, $g(A)$ represents a reference generating function using the average of RSSs included in the device signal fingerprint, and $h(A)$ represents a reference generating function using a variation between device signal fingerprints.

The reference signal fingerprint 11 and the device signal fingerprint 21 may be repeatedly collected from the same or similar place at regular intervals in order to increase the accuracy. Herein, $h(S)$ and $h(A)$ are reference generating functions using variations of the repeatedly collected reference signal fingerprints and device signal fingerprints. Herein, $h(S)$ and $h(A)$ may be reference generating functions considering changes in environment where a device signal fingerprint or a reference signal fingerprint is collected. For example, changes such as interference by another signal or a change in floating population in a store may be considered. Herein, a, b, c, a', b', and c' are weightings which vary depending on characteristics of a store, characteristics of the user device 20, and the surrounding network environment.

For example, as the sum and the average of RSSs of a signal fingerprint are increased and a variation is decreased, a reference value may be set high.

In another example of setting a reference value, the location recognizing apparatus 100 may receive an internal signal fingerprint collected from a region inside the store and an external signal fingerprint collected from a region outside the store. The internal signal fingerprint and the external signal fingerprint may be different from the reference signal fingerprint 11. For example, the internal signal fingerprint may be a signal fingerprint measured from a location very adjacent to an entrance door inside the store (e.g., a location away from the entrance door toward the inside of the store by half a straight distance between the center of the store and the entrance door), and the external signal fingerprint may be a signal fingerprint measured from a location very adjacent to the entrance door outside the store (e.g., a location away from the entrance door toward the outside of the store by half the straight distance between the center of the store and the entrance door). For example, the internal signal fingerprint and the external signal fingerprint may be collected by the signal fingerprint measurement device 10. The location recognizing apparatus 100 may calculate an internal similarity between the device signal fingerprint 21 and the internal signal fingerprint and an external similarity between the device signal fingerprint 21 and the external signal fingerprint. Further, the location recognizing apparatus 100 may set any one of inter-values between the internal similarity and the external similarity as a reference value. For example, in the case where the internal similarity is 0.8 and the external similarity is 0.6, a setting unit 150 may set the average value 0.7 as a reference value. As such, a reference value is set using a signal fingerprint measured from a location very adjacent to the entrance door inside the store and a signal fingerprint measured from a location very adjacent to the entrance door outside the store, and, thus, it is possible to more accurately set a reference value for recognizing the inside of the store.

In yet another example of setting a reference value, if the user device 20 is determined as being inside the store, the location recognizing apparatus 100 may record a similarity between the reference signal fingerprint 11 and the device signal fingerprint 21 which corresponds to the case where the user device 20 is determined as being inside the store. For example, whenever one or more different user devices 20 are determined as being inside the store, the location recognizing apparatus 100 may repeatedly perform the recording of a similarity.

Further, the location recognizing apparatus 100 may average top n number of similarities among similarities recorded in the database and set the reference value in consideration of the average of the similarities and a store characteristic coefficient. For example, the location recognizing apparatus 100 may set a reference value by subtracting the store characteristic coefficient from the average of the similarities. The store characteristic coefficient may be set on the basis of at least one of the scale of the store, a material of an outer wall, interior, and the kind and performance of an access point installed in the store and may be used to set a reference value while reflecting characteristics of the store. For example, as the store has a greater scale, the store characteristic coefficient may have a smaller value.

As such, a reference value for a specific store is generated in consideration of the average value of top n number of similarities between a reference signal fingerprint and a device signal fingerprint in the case where the user device 20 is determined as being inside the store and a store characteristic coefficient of the store, and, thus, it is possible to more accurately determine that the user device 20 is located inside the store.

The location recognizing apparatus 100 may set a reference value by the above-described method and determine a location of the user device 20 by comparing the reference value with a similarity between each reference signal fingerprint and a device signal fingerprint. If the similarity is equal to or higher than the reference value associated with a specific store, the location recognizing apparatus 100 may determine that the user device 20 is located inside the store.

According to an embodiment of the present disclosure, the location recognizing apparatus 100 may compare the highest similarity (first similarity) among the similarities between the device signal fingerprint 21 and the reference signal fingerprints 11 for the respective multiple stores with a reference value for a first store associated with a reference signal fingerprint corresponding to the first similarity. The location recognizing apparatus 100 may calculate similarities between the device signal fingerprint 21 and the reference signal fingerprints 11 for the respective multiple stores and determine the first similarity which is the highest similarity. Further, the location recognizing apparatus 100 may compare a reference signal fingerprint for a store having the first similarity with a reference value for an associated store (first store). If the first similarity is equal to or higher than the reference value for the first store, the location recognizing apparatus 100 may determine that the user device 20 is located inside the first store.

In another example of determining a location of the user device 20 by the location recognizing apparatus 100, the location recognizing apparatus 100 may determine whether the similarities between the device signal fingerprint 21 and the reference signal fingerprints for the respective multiple stores are equal to or higher than reference values for the respective multiple stores. That is, the location recognizing apparatus 100 may calculate a similarity between the device signal fingerprint 21 and a reference signal fingerprint for each store and determine whether the calculated similarity is equal to or higher than the reference value for each store. Further, the location recognizing apparatus 100 may determine that the user device 20 is located inside the store (first store) associated with the reference signal fingerprint 11 corresponding to the first similarity which is the highest similarity among similarities equal to or higher than the reference values for the respective multiple stores. That is, the location recognizing apparatus 100 may determine that the user device 20 is located inside the first store corresponding to the first similarity which is the highest similarity among the similarities equal to or higher than the reference values.

In yet another example of determining a location of the user device 20 by the location recognizing apparatus 100, the location recognizing apparatus 100 may receive an external signal fingerprint collected from a region outside the store. For example, the external signal fingerprint may be collected by the signal fingerprint measurement device 10. Further, the location recognizing apparatus 100 may calculate an external similarity between the device signal fingerprint 21 and an external signal fingerprint 13. Furthermore, the location recognizing apparatus 100 may determine a location of the user device 20 according to a result of comparison between a similarity between the device signal fingerprint 21 and the reference signal fingerprint 11 and a similarity between the device signal fingerprint 21 and the external signal fingerprint. For example, if the similarity between the reference signal fingerprint 11 and the device signal fingerprint 21 is higher than the similarity between the device signal fingerprint 21 and the external signal fingerprint, the location recognizing apparatus 100 may determine that the user device 20 is located inside the store.

According to an embodiment of the present disclosure, if the user device 20 is determined as being inside the store, the location recognizing apparatus 100 may transmit information indicating that the user device 20 is located inside the store to the user device 20. The user device 20 may drive an application installed in the user device 20 on the basis of receipt of the information. Further, the user device 20 may be provided with information, such as information about products sold in the store, discount coupons, events, etc., by the application.

Figure 2:
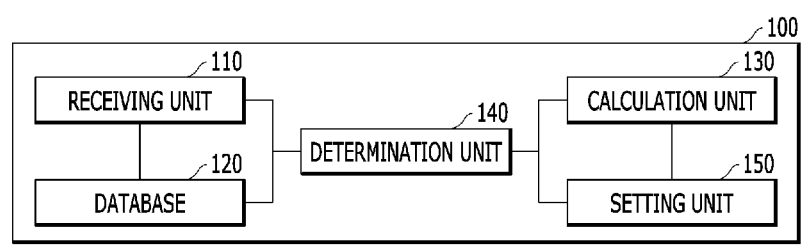
FIG. 2 is a diagram illustrating a configuration of a location recognizing apparatus of a user device according to an embodiment of the present disclosure.
Figure 3:
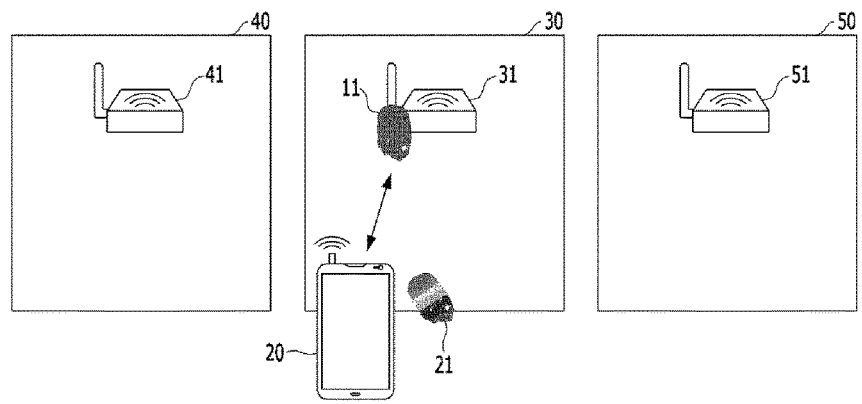
FIG. 3 is a diagram illustrating a first embodiment for recognizing a location of a user device according to an embodiment of the present disclosure.

FIG. 2 is a diagram illustrating a configuration of a location recognizing apparatus of a user device according to an embodiment of the present disclosure, and FIG. 3 is a diagram illustrating a first embodiment for recognizing a location of a user device according to an embodiment of the present disclosure.

Referring to FIG. 2, the location recognizing apparatus 100 may include a receiving unit 110, a database 120, a calculation unit 130, a determination unit 140, and a setting unit 150.

The receiving unit 110 may receive the device signal fingerprint 21 from at least one user device 20. Further, the receiving unit 110 may receive the reference signal fingerprint 11 from at least one signal fingerprint measurement device 10. The database 120 may store reference signal fingerprints 11 collected from the insides of multiple stores 30, 40, and 50 in association with store information (e.g., store names).

Referring to FIG. 3, the user device 20 may generate the device signal fingerprint 21 including signals transmitted from multiple access points 31, 41, and 51 adjacent to each other. For convenience in explanation, it is assumed that the multiple access points 31, 41, and 51 are installed in the multiple stores 30, 40, and 50, respectively, but the present disclosure is not limited thereto. The signal fingerprint measurement device 10 may receive signals transmitted from the access points 31, 41, and 51 in the respective stores 30, 40, and 50, and collect the reference signal fingerprint 11 from the signals. For example, a reference signal fingerprint collected from the store 40 may include BSSIDs received from the access points 31 and 41 and strength information thereof, and a reference signal fingerprint collected from the store 30 may include BSSIDs received from the access points 31, 41, and 51 and strength information thereof. As such, a reference signal fingerprints for each store may be different from each other depending on the network environment of each store.

FIG. 6 is a diagram illustrating an example of a fingerprint according to an embodiment of the present disclosure.

Referring to FIG. 6, the reference signal fingerprint 11 may include multiple sets, each including a BSSID of an access point and RSS information between a store and the access point. The reference signal fingerprint 11 may include a BSSID 610 of an access point a 41 installed in a store a 40 and RSS information a 611 between the signal fingerprint measurement device 10 and the access point a 41 in a set (set a). Likewise, the reference signal fingerprint 11 may include a set b including a BSSID 620 of an access point b 31 installed in a store b 30 and RSS information b 621 and a set c including a BSSID 630 of an access point c 51 installed in a store c 50 and RSS information c 631.

The device signal fingerprint 21 may have the same form as the reference signal fingerprint 11 described with reference to FIG. 6 except RSS information between the user device 20 and an access point, and, thus, redundant explanation thereof will be omitted.

According to an embodiment of the present disclosure, each store may have different characteristics such as the size of a store, the thickness of a wall, etc. and an access point adjacent to each store may be different in kind and performance. Therefore, a reference signal fingerprint collected from each store may include a set including a different BSSID and different RSS information. Further, the device signal fingerprint 21 may include a BSSID and RSS which may vary depending on a location of the user device 20 or the surrounding environment as well as the above-described characteristics of a store and an access point.

The calculation unit 130 may calculate a similarity between the reference signal fingerprint 11 and the device signal fingerprint 21. Further, the calculation unit 130 may calculate similarities between the device signal reference 21 and reference signal fingerprints for respective multiple stores. For example, the calculation unit 130 may calculate a similarity using Equation 1. Equation 1 has been explained above, and, thus, redundant explanation thereof will be omitted.

$$\text{Similarity} = e*j(S,A) + f*k(S,A) + g*l(S,A) \quad \text{[Equation 1]}$$

The determination unit 140 may determine whether the user device 20 is located inside or outside the store on the basis of the similarity. In this case, the determination unit 140 may determine whether the user device 20 is located inside or outside the store by comparing the similarity with a reference value set by the setting unit 150. For example, if the similarity is equal to or higher than the reference value when the determination unit 140 compares the similarity with the reference value, the determination unit 140 may determine that the user device 20 is located inside the store.

The setting unit 150 may set a reference value for determining the inside or the outside of the store. For example, the setting unit 150 may set reference values for respective multiple stores on the basis of the reference signal fingerprints for the respective multiple stores.

In an example of setting a reference value by the setting unit 150, the setting unit 150 may set a reference value on the basis of the RSS included in the device signal fingerprint 21 and the RSS included in the reference signal fingerprint 11. The setting unit 150 may set a reference value using Equation 3. Equation 3 has been explained above, and, thus, redundant explanation thereof will be omitted.

$$\text{Reference value} = a*f(S) + b*g(S) + c*h(S) + a'*f(A) + b'*g(A) + c'*h(A) \quad \text{[Equation 2]}$$

Figure 4:
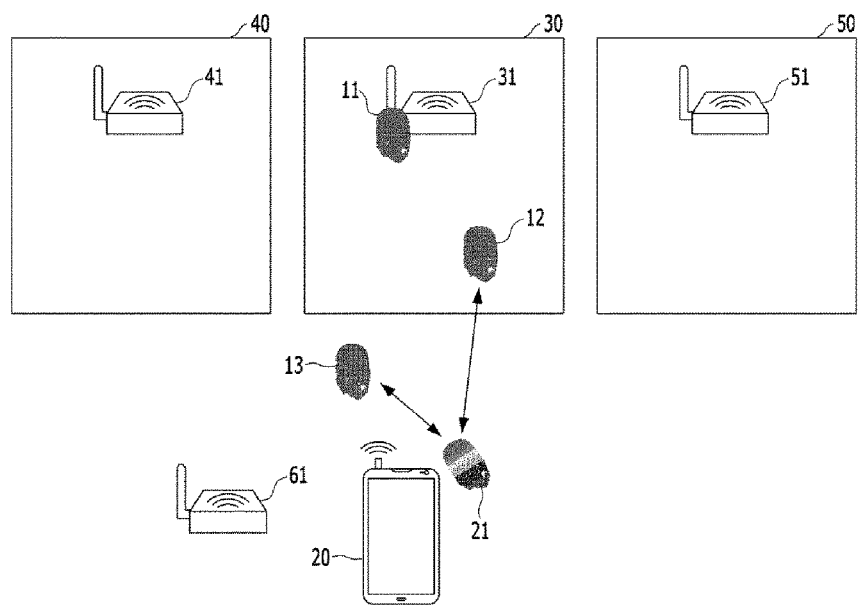
FIG. 4 is a diagram illustrating a second embodiment for recognizing a location of a user device according to an embodiment of the present disclosure.

FIG. 4 is a diagram illustrating a second embodiment for recognizing a location of a user device according to an embodiment of the present disclosure.

Another example of setting a reference value by the setting unit 150 will be described with reference to FIG. 4. Referring to FIG. 4, the receiving unit 110 may receive an internal signal fingerprint 12 collected from a region inside the store 30 and an external signal fingerprint 13 collected from a region outside the store 30. For example, the internal signal fingerprint 12 and the external signal fingerprint 13 may be collected by the signal fingerprint measurement device 10. The internal signal fingerprint 12 may include a set of signals transmitted from the access point 31 installed in the store 30 and a set of signals transmitted from the access points 41 and 51 installed in the adjacent stores 40 and 50. Meanwhile, the external signal fingerprint 13 may not include the set for the access points 41 and 51 of the adjacent stores 40 and 50 since the signals transmitted from the access points 41 and 51 installed in the adjacent stores 40 and 50 do not reach a location of the signal fingerprint measurement device 10 that collects the external signal fingerprint 13, or may include any one of the signals. Further, the external signal fingerprint 13 may include a set of signals transmitted from another access point 61.

Furthermore, the calculation unit 130 may calculate an internal similarity between the device signal fingerprint 21 and the internal signal fingerprint 12 and an external similarity between the device signal fingerprint 21 and the external signal fingerprint 13. Moreover, the setting unit 150 may set any one of inter-values between the internal similarity and the external similarity as a reference value. For example, in the case where the internal similarity is 0.8 and the external similarity is 0.6, a setting unit 150 may set an inter-value 0.7 as a reference value. For another example, the setting unit 150 may obtain the average of the internal similarity and the external similarity and set the average as a reference value. A method of setting an inter-value as a reference value by the setting unit 150 is not limited to the above-described example. If the similarity between the reference signal fingerprint 11 and the device signal fingerprint 21 is equal to or higher than the reference value, the determination unit 140 may determine that the user device 20 is located inside the store.

In yet another example of setting a reference value by the setting unit 150, the databased 120 may record similarities between reference signal fingerprints and device signal fingerprints which correspond to the case where user devices are determined as being inside the stores 30, 40, and 50, respectively, in association with the respective stores 30, 40, and 50.

Further, the setting unit 150 may average top n number of similarities among the similarities recorded in the database 120 and set a reference value in consideration of the average of the similarities and a store characteristic coefficient. For example, the setting unit 150 may set a reference value by subtracting the store characteristic coefficient from the average of the similarities.

The store characteristic coefficient may be set on the basis of at least one of the scale and size of the store, a material of an outer wall, and the kind and performance of an access point installed in the store and may be used to set a reference value while reflecting characteristics of the store. For example, in the case where a store is a large-scale restaurant, if a similarity satisfies a predetermined level, it is less likely to make a miscalculation when the user device 20 is determined as being inside the restaurant, due to the large scale of the restaurant. On the other hand, in the case where a store is a small-scale convenient store, if a reference value is too high, it is difficult to recognize that the user device 20 is located inside the store. Therefore, the reference value needs to be set relatively low to determine that the user device 20 is located inside the store. As such, a reference value is set in consideration of a store characteristic coefficient depending on characteristics of a store, and, thus, it is possible to more accurately recognize a location of the user device 20 inside or outside the store.

Further, according to an embodiment of the present disclosure, the determination unit 140 may compare a first similarity which is the highest similarity among the similarities between the device signal fingerprint 21 and the reference signal fingerprints for the respective multiple stores with a reference value for the first store 30 associated with a reference signal fingerprint 11 corresponding to the first similarity. Further, if the first similarity is equal to or higher than the reference value for the first store 30, the determination unit 140 may determine that the user device 20 is located inside the first store 30.

For another example, the determination unit 140 may determine whether the similarities between the device signal fingerprint 21 and the reference signal fingerprints for the respective multiple stores are equal to or higher than reference values for the respective multiple stores. Further, the determination unit 140 may determine that the user device 20 is located inside the first store 30 associated with the reference signal fingerprint 11 corresponding to the first similarity which is the highest similarity among similarities equal to or higher than the reference values for the respective multiple stores. That is, the determination unit 140 may determine that the user device 20 is located inside the store (first store 30) corresponding to the first similarity which is the highest similarity among the similarities equal to or higher than the reference values.

FIG. 5 is a diagram illustrating a third embodiment for recognizing a location of a user device according to an embodiment of the present disclosure. The receiving unit 110 may receive the external signal fingerprint 13 collected from a region outside the store 30. For example, the external signal fingerprint 13 may be collected by the signal fingerprint measurement device 10. The external signal fingerprint 13 may not include a set for the access points 41 and 51 of the adjacent stores 40 and 50 since signals transmitted from the access points 41 and 51 installed in the adjacent stores 40 and 50 do not reach a location of the signal fingerprint measurement device 10 that collects the external signal fingerprint 13, or may include any one of the signals. Further, the external signal fingerprint 13 may include a set of signals transmitted from another access point 61.

Furthermore, the calculation unit 130 may calculate a similarity between the device signal fingerprint 21 and the external signal fingerprint 13. If a similarity between the reference signal fingerprint 11 and the device signal fingerprint 21 is higher than the similarity between the device signal fingerprint 21 and the external signal fingerprint 13, the determination unit 140 may determine that the user device 20 is located inside the store 30.

Figure 7:
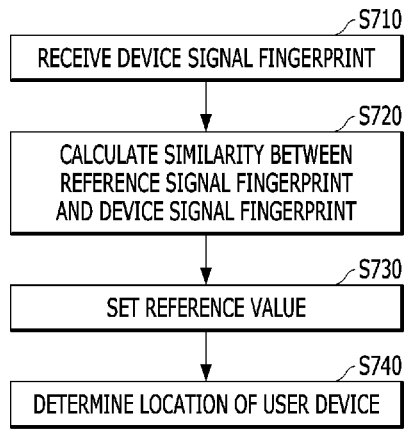
FIG. 7 is a flowchart showing an example of a method of recognizing a location of a user device according to an embodiment of the present disclosure.

FIG. 7 is a flowchart showing an example of a method of recognizing a location of a user device according to an embodiment of the present disclosure.

The method of recognizing a location of a user device illustrated in FIG. 7 to FIG. 10 is performed by the location recognizing apparatus 100 of the user device described above with reference to FIG. 1 to FIG. 6. Therefore, descriptions of the location recognizing apparatus 100 illustrated in FIG. 1 to FIG. 6 may be identically applied to FIG. 7 to FIG. 10, even though they are omitted hereinafter.

Referring to FIG. 7, the receiving unit 110 may receive the device signal fingerprint 21 from the user device 20 in S710.

In S720, the calculation unit 130 may calculate a similarity between the device signal fingerprint 21 and the reference signal fingerprint 11 collected inside a store and stored in the database 120 in association with store information.

In S730, the setting unit 150 may set a reference value for determining the inside or the outside of the store. For example, the setting unit 150 may set reference values for respective multiple stores on the basis of RSSs included in reference signal fingerprints for the respective multiple stores and an RSS included in the device signal fingerprint 21.

In S740, the determination unit 140 may determine whether the user device 20 is located inside or outside the store on the basis of a result of comparison between the similarity and the reference value. For example, if the similarity is equal to or higher than the reference value when the determination unit 140 compares the similarity with the reference value, the determination unit 140 may determine that the user device 20 is located inside the store.

Figure 8:
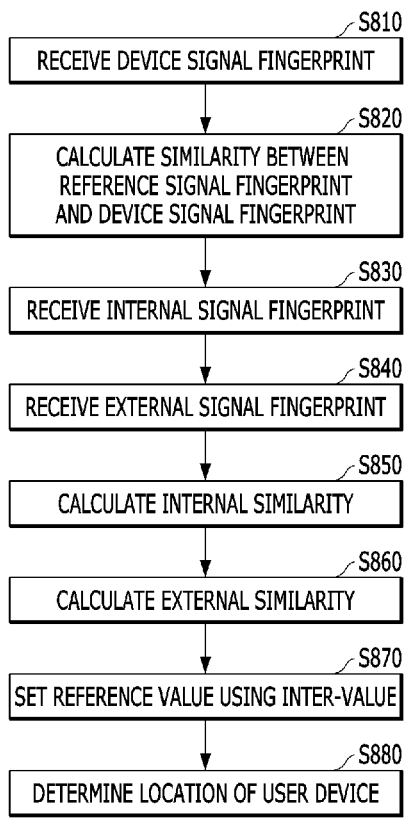
FIG. 8 is a flowchart showing another example of a method of recognizing a location of a user device according to an embodiment of the present disclosure.

FIG. 8 is a flowchart showing another example of a method of recognizing a location of a user device according to an embodiment of the present disclosure.

Referring to FIG. 8, the receiving unit 110 may receive the device signal fingerprint 21 from the user device 20 in S810.

In S820, the calculation unit 130 may calculate a similarity between the device signal fingerprint 21 and the reference signal fingerprint 11 collected inside a store and stored in the database 120 in association with store information. S810 and S820 can be understood as having the same concepts as S710 and S720, respectively, and, thus, redundant explanation thereof will be omitted.

In S830, the receiving unit 110 may receive the internal signal fingerprint 12 collected from a region inside the store. In S840, the receiving unit 110 may receive the external signal fingerprint 13 collected from a region outside the store.

In S850, the calculation unit 130 may calculate an internal similarity between the device signal fingerprint 21 and the internal signal fingerprint 12. In S860, the calculation unit 130 may calculate an external similarity between the device signal fingerprint 21 and the external signal fingerprint 13.

In S870, the setting unit 150 may set any one of inter-values between the internal similarity and the external similarity as a reference value. In S880, if the similarity between the reference signal fingerprint 11 and the device signal fingerprint 21 is equal to or higher than the reference value, the determination unit 140 may determine that the user device 20 is located inside the store.

Figure 9:
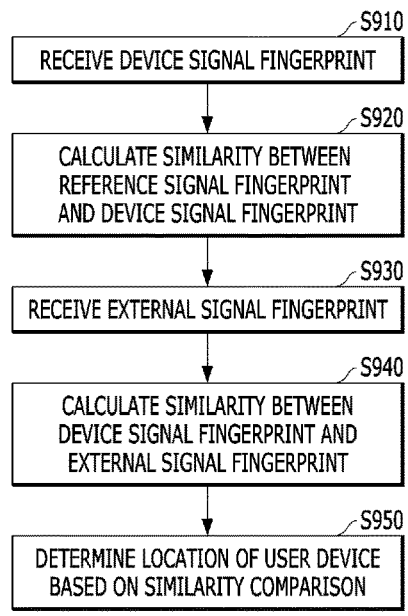
FIG. 9 is a flowchart showing yet another example of a method of recognizing a location of a user device according to an embodiment of the present disclosure.

FIG. 9 is a flowchart showing yet another example of a method of recognizing a location of a user device according to an embodiment of the present disclosure.

Referring to FIG. 9, the receiving unit 110 may receive the device signal fingerprint 21 from the user device 20 in S910.

In S920, the calculation unit 130 may calculate a similarity between the device signal fingerprint 21 and the reference signal fingerprint 11 collected inside a store and stored in the database 120 in association with store information. S910 and S920 can be understood as having the same concepts as S710 and S720, respectively, and, thus, redundant explanation thereof will be omitted.

In S930, the receiving unit 110 may receive the external signal fingerprint 13 collected from a region outside the store.

In S940, the calculation unit 130 may calculate an external similarity between the device signal fingerprint 21 and the external signal fingerprint 13. In S950, the determination unit 140 may determine a location of the user device 20 inside or outside the store on the basis of a result of comparison between the similarity between the reference signal fingerprint 11 and the device signal fingerprint 21 and the external similarity between the device signal fingerprint 21 and the external signal fingerprint 13. For example, if the similarity between the reference signal fingerprint 11 and the device signal fingerprint 21 is higher than the similarity between the device signal fingerprint 21 and the external signal fingerprint 13, the determination unit 140 may determine that the user device 20 is located inside the store 30.

Figure 10:
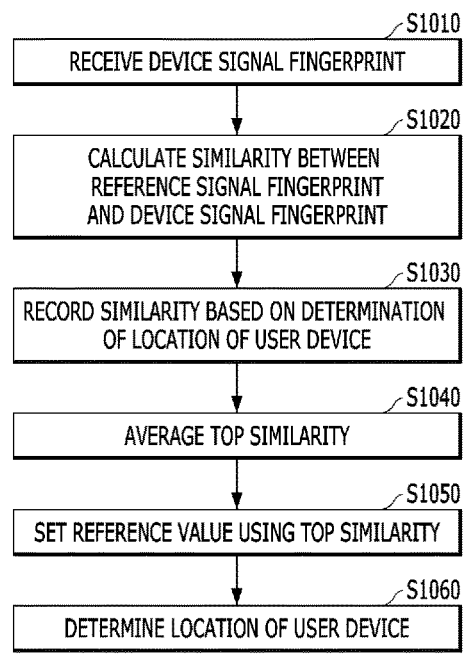
FIG. 10 is a flowchart showing still another example of a method of recognizing a location of a user device according to an embodiment of the present disclosure.

FIG. 10 is a flowchart showing still another example of a method of recognizing a location of a user device according to an embodiment of the present disclosure.

Referring to FIG. 10, the receiving unit 110 may receive the device signal fingerprint 21 from the user device 20 in S1010.

In S1020, the calculation unit 130 may calculate a similarity between the device signal fingerprint 21 and the reference signal fingerprint 11 collected inside a store and stored in the database 120 in association with store information. S1010 and S1020 can be understood as having the same concepts as S710 and S720, respectively, and, thus, redundant explanation thereof will be omitted.

In S1030, the database 120 may record a similarity between a reference signal fingerprint and a device signal fingerprint which corresponds to the case where the user device is determined as being inside the store.

In S1040, the setting unit 150 may average top n number of similarities among similarities recorded in the database 120. In S1050, the setting unit 150 may set a reference value in consideration of the average of the similarities and a store characteristic coefficient.

In S1060, if the similarity between the reference signal fingerprint 11 and the device signal fingerprint 21 is equal to or higher than the reference value, the determination unit 140 may determine that the user device 20 is located inside the store.

It can be understood that the sequence of the processes shown in the flowcharts of FIG. 7 to FIG. 10 may be changed if necessary and at least two processes may be performed simultaneously.

Meanwhile, an access point may be removed or a new access point may be added due to changes in store or environment around the store (opening of a store, closing of a store, alteration to a store, etc.) with the lapse of time. In this case, reference signal fingerprints for the store recorded in the database were previously collected from access points around the store, and, thus, if it is determined whether the user device's visit of the store is recognized only on the basis of the reference signal fingerprints of the past, the performance in determining the recognition of a store visit may be degraded. Therefore, information about the store needs to be updated according to changes in network environment of the store.

A store information update according to an embodiment of the present disclosure to be described below may be performed by the location recognizing system 1000 including the location recognizing apparatus 100, the signal fingerprint measurement device 10, and the user device 20 illustrated in FIG. 1. The above-described location recognizing system 1000 may include the configuration and the function of a market information updating system 1000 described in detail in Korean Patent Application No. 10-2017-0033668 or include the market information updating system 1000 itself, and the above-described location recognizing apparatus 100 may include the configuration and the function of an updating apparatus 100 described in detail in Korean Patent Application No. 10-2017-0033668 or include the updating apparatus 100 itself.

Figure 11:
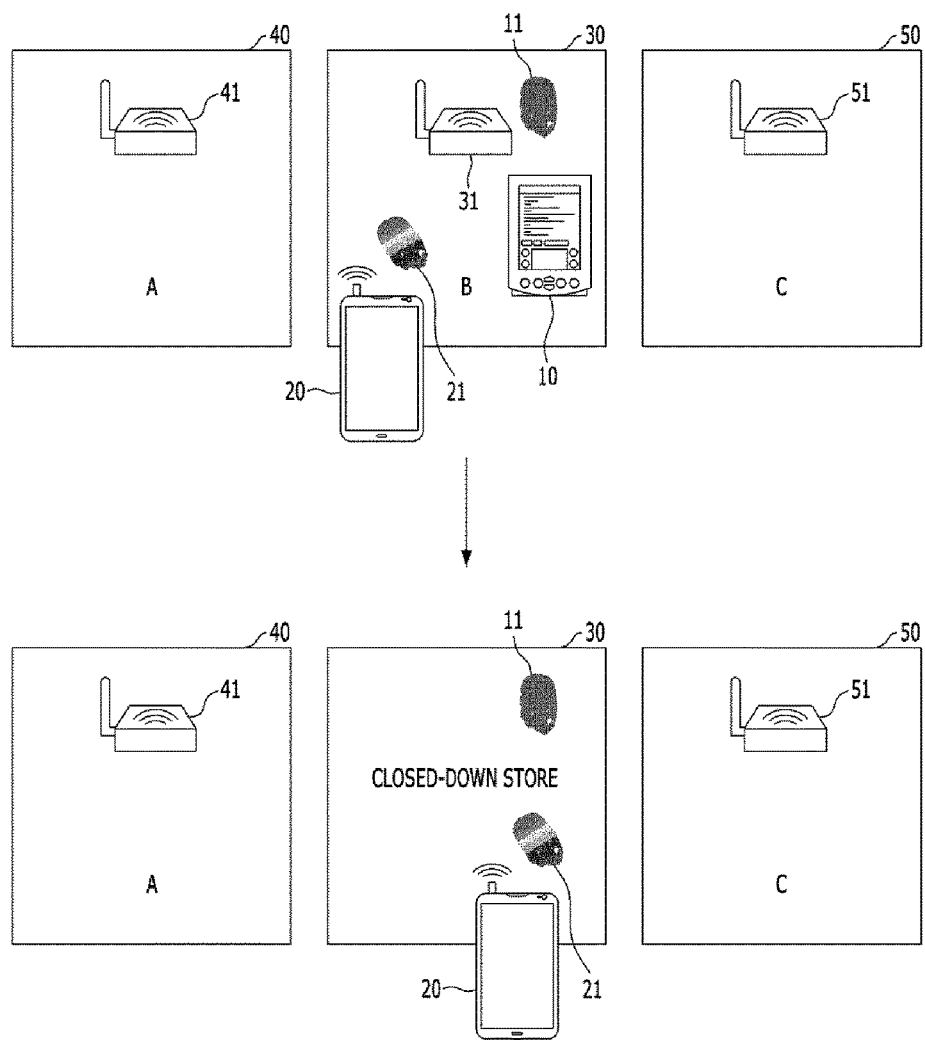
FIG. 11 is a diagram illustrating a first embodiment for updating store information according to an embodiment of the present disclosure.

FIG. 11 is a diagram illustrating a first embodiment for updating store information according to an embodiment of the present disclosure.

The location recognizing apparatus 100 may generate a visit recognition pattern including similarities between device signal fingerprints for multiple user devices recognized as being inside a store and a reference signal fingerprint for the store. The location recognizing apparatus 100 may calculate the similarities between the device signal fingerprints for the respective multiple user devices and the reference signal fingerprint on the basis of the above-described similarity calculation method, and similarities corresponding to the case where a user device is recognized as being inside the store on the basis of a similarity equal to or higher than a reference value may be accumulated and stored in the database in association with identification information and reference signal fingerprints for respective stores. Further, the location recognizing apparatus 100 may further include daily visit count information corresponding to the case where a user device is recognized as being inside the store for a day to generate the visit recognition pattern and store the visit recognition pattern in the database. In the following description, a similarity between a device signal fingerprint for a user device determined as being inside a store and a reference signal fingerprint for the store will be referred to as a first similarity.

Referring to FIG. 11, the location recognizing apparatus 100 may receive device signal fingerprints 21 from multiple user devices 20. Although FIG. 11 illustrates a single user device 20, there may be multiple user devices 20, and the location recognizing apparatus 100 may receive device signal fingerprints 21 from the multiple user devices 20.

Referring to FIG. 11, the user device 20 may generate the device signal fingerprint 21 including signals transmitted from the multiple access points 31, 41, and 51 adjacent to each other. The device signal fingerprint 21 may include BSSIDs received from the access points 31, 41, and 51 and strength information thereof. For convenience in explanation, the multiple access points 31, 41, and 51 are assumed as installed in the multiple stores 30, 40, and 50, respectively, but the present disclosure is not limited thereto.

The signal fingerprint measurement device 10 may receive signals transmitted from the access points 31, 41, and 51 in the respective stores 30, 40, and 50, and collect the reference signal fingerprint 11 from the signals. For example, a reference signal fingerprint collected from the store 40 may include BSSIDs received from the access points 31 and 41 and strength information thereof, and a reference signal fingerprint collected from the store 30 may include BSSIDs received from the access points 31, 41, and 51 and strength information thereof. As such, a reference signal fingerprints for each store may be different from each other depending on the network environment of each store.

Further, the location recognizing apparatus 100 may calculate similarities between the reference signal fingerprint 11 for the store 30 and the device signal fingerprints 21 for the multiple user devices 20. The similarities can be calculated using the Equation 1 or the Equation 2. Further, the location recognizing apparatus 100 may determine whether the multiple user devices 20 are located inside the store 30 on the basis of the respective similarities. The determination of a location of the user device 20 has been described above, and, thus, redundant explanation thereof will be omitted.

According to an embodiment of the present disclosure, the location recognizing apparatus 100 may update a reference signal fingerprint for a store on the basis of a calculation result of the similarities. For example, if the number of times that the similarities between the reference signal fingerprint 11 and the device signal fingerprints 21 for the multiple user devices are lower than the first similarity exceeds a predetermined value, the location recognizing apparatus 100 may recollect a reference signal fingerprint for the store.

Referring to FIG. 11, a description mainly of the store 30 will be provided. The store 30 is assumed as a store with 100 visits per day (herein, the visit count corresponds to the number of times that the user device 20 is recognized as located inside the store 30) and a reference value for the store 30 is assumed as 0.7. In this case, a user visits the store 30, and the first similarity between the device signal fingerprint 21 for the user device 20 located inside the store 30 and the reference signal fingerprint 11 for the store 30 is assumed as 0.8 or more. That is, a visit recognition pattern associated with the store 30 and stored in the database of the location recognizing apparatus 100 may include the first similarity of 0.8 and the daily visit count of 100.

Referring to FIG. 11, in the case where the access point 31 installed in the store 30 is removed due to, e.g., closing or relocation of the store 30, if the user device 20 moves to a location where the store 30 existed, the device signal fingerprint 21 for the user device 20 may include a set of signals transmitted from the access points 41 and 51 of the adjacent stores 40 and 50 except the store 30. Meanwhile, the reference signal fingerprint 11 for the store 30 stored in the database of the location recognizing apparatus 100 still includes a set of signals transmitted from the access point 31. In this case, if the location recognizing apparatus 100 calculates a similarity between the device signal fingerprint 21 and the reference signal fingerprint 11, the similarity between the device signal fingerprint 21 and the reference signal fingerprint 11 is low since the device signal fingerprint 21 does not include a set of signals transmitted from the access point 31 of the store 30. Specifically, when a similarity is calculated, an RSS with a minimum value is assigned to the device signal fingerprint 21 in association with a set for the store 30, the similarity between the device signal fingerprint 21 and the reference signal fingerprint 11 is calculated as a low value. This may be applied equally to the multiple user devices 20 located adjacent to the store 30. Therefore, the user device 20 may not be recognized as being inside the store 30 suddenly or the number of recognitions may be decreased.

According to the visit recognition pattern associated with the store 30 and stored in the database, the first similarity of the store 30 is 0.8. In the case where the similarities between the reference signal fingerprint 11 and the device signal fingerprints 21 for the multiple user devices 20 are continuously calculated as equal to or higher than the first similarity and suddenly, the number of times that the similarities between the reference signal fingerprint 11 and the device signal fingerprints 21 for the multiple user devices 20 are lower than the first similarity (0.8) exceeds a predetermined value (e.g., 50 times), the location recognizing apparatus 100 may recognize that there is something wrong with the access point of the store 30 or the store 30 was closed down or relocated.

Further, according to the visit recognition pattern associated with the store 30 and stored in the database, the daily visit count for the store 30 is 100. In the case where a difference between a store inside recognition count determined on the basis of a calculation result of the similarities between the device signal fingerprints 21 for the multiple user devices 20 and the reference signal fingerprint 11 for the store 30 and a daily visit count (100 times) recorded in the recognition pattern exceeds a predetermined value (e.g., 50 times), the location recognizing apparatus 100 may recognize that there is something wrong with the access point of the store 30 or there is a change in wireless signal receiving environment due to closing or relocation of the store 30 or alteration to the interior.

As described above, according to an embodiment of the present disclosure, in the case where a store is closed down or a network environment is changed, when similarities between device signal fingerprints for multiple user devices and a reference signal fingerprint in a database are calculated, the similarities are suddenly decreased, and, thus, a store visit recognition count is decreased. Accordingly, a change in the store is recognized, and the signal fingerprint measurement device 10 located in the store recollects a reference signal fingerprint for the store and updates the reference signal fingerprint.

Meanwhile, even if the access point 31 is not present in the store 30, a similarity may be calculated as equal to or higher than a reference value due to an RSS with a minimum value. Therefore, by setting a predetermined value for the number of times being lower than the first similarity and a predetermined value for a difference in daily visit count, it is possible to increase the accuracy in recognizing a change in the store 30. In the case where the location recognizing apparatus 100 recognizes a change in the store 30, the location recognizing apparatus 100 may recollect a reference signal fingerprint for the store 30 as described above.

According to an embodiment of the present disclosure, in the case where the location recognizing apparatus 100 recognizes a change in the store 30, the location recognizing apparatus 100 may transmit store change recognition information to the outside. For example, the location recognizing apparatus 100 may transmit the information to a web server that provides a portal site or the like. The web server may recognize a change in the store on the basis of the store change recognition information, and when providing services such as map, path finding, event, store information, etc., the web server can provide services updated using the recognition information.

For example, in a map service, a closed-down store or relocated store may be displayed on a map on the basis of the recognition information. For another example, the display of a closed-down store or relocated store may be removed from the map in order for a user not to recognize previous information about the store. Further, the possibility of closing of a store may be displayed as a store information search result provided to users.

Figure 12:
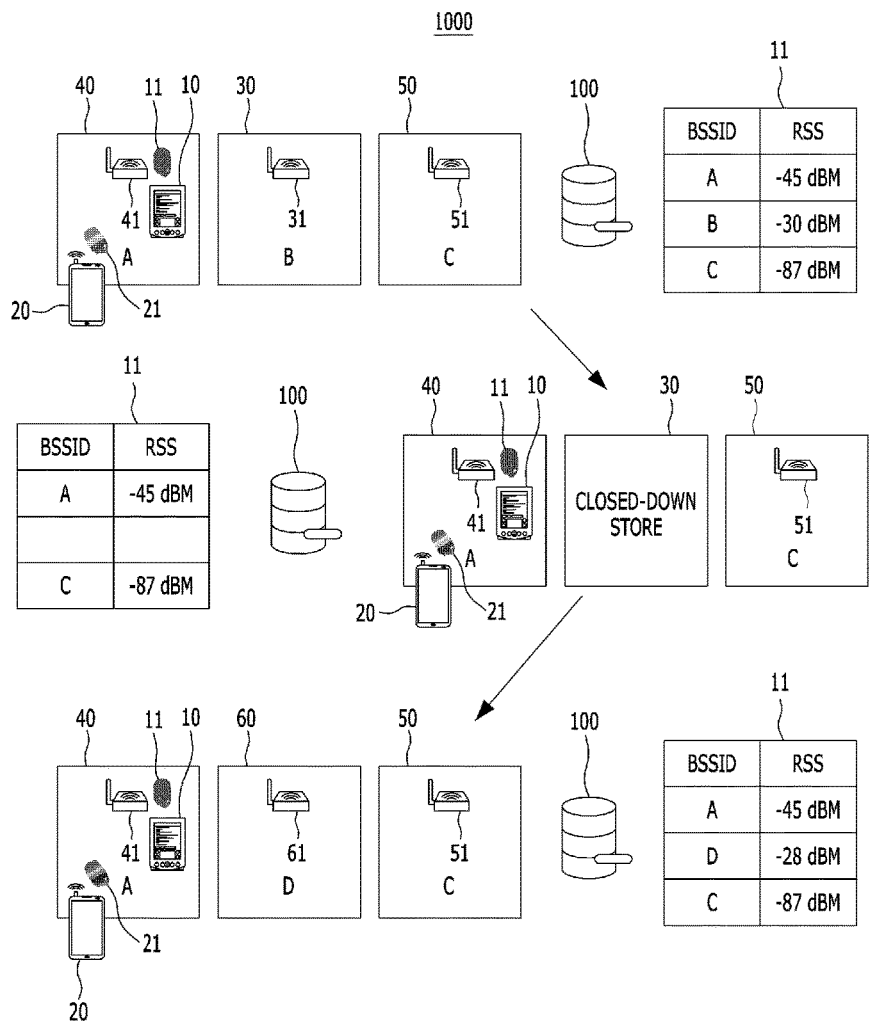
FIG. 12 is a diagram illustrating a second embodiment for updating store information according to an embodiment of the present disclosure.

FIG. 12 is a diagram illustrating a second embodiment for updating store information according to an embodiment of the present disclosure.

Referring to FIG. 12, it is assumed that the reference signal fingerprint 11 for a store A stored in the database of the location recognizing apparatus 100 includes a set of a BSSID A and its RSS, a set of a BSSID B and its RSS, and a set of a BSSID C and its RSS. Further, it is assumed that the reference signal fingerprint 11 includes about 50 sets of a BSSID and its RSS although not illustrated in FIG. 12.

According to an embodiment of the present disclosure, the location recognizing apparatus 100 compares a BSSID of a device signal fingerprint for at least one user device recognized as being inside the store among multiple user devices with a BSSID of a reference signal fingerprint. Further, the location recognizing apparatus 100 may update the reference signal fingerprint with a BSSID which is not superimposed between the device signal fingerprint for the user device and the reference signal fingerprint and its RSS.

For example, in the case where a store B 30 adjacent to the store A 40 is closed down, device signal fingerprints 21 received from multiple user devices 20 recognized as located inside the store A 40 after closing of the store B 30 may include a set for the store A 40 and a set for a store C 50 except a set (set of the BSSID B and its RSS) for the store B 30. In this case, the location recognizing apparatus 100 may compare a BSSID of a reference signal fingerprint 11 for the store A 40 with a BSSID of a device signal fingerprint 21 for a user device 20 determined as located inside the store A 40. Further, the location recognizing apparatus 100 may update a non-superimposed BSSID and its RSS of the reference signal fingerprint 11 with the BSSID and its RSS of the device signal fingerprint 21 of the user device 20. For example, the location recognizing apparatus 100 may add a BSSID which is not included in the reference signal fingerprint but included in the device signal fingerprint for the at least one user device to the reference signal fingerprint or delete a BSSID which is included in the reference signal fingerprint but not included in the device signal fingerprint for the at least one user device from the reference signal fingerprint.

Specifically, the reference signal fingerprint 11 for the store A 40 stored in the database of the location recognizing apparatus 100 may include BSSIDs of the store A 40, the store B 30, and the store 50, respectively. However, after the store B 30 is closed down, the device signal fingerprint 21 received from the user device 20 located inside the store A 40 may include the BSSID of the store A 40 and the BSSID of the store C 50 except the BSSID of the store B. The location recognizing apparatus 100 may compare a BSSID of the reference signal fingerprint for the store A 40 with the BSSID of the device signal fingerprint for the user device located inside the store A 40 to update a non-superimposed BSSID of the reference signal fingerprint for the store A 40 with the BSSID of the device signal fingerprint 21 for the user device 20. That is, the location recognizing apparatus 100 may update to delete the BSSID of the store B 30 from the reference signal fingerprint for the store A 40.

For another example, in the case where a store D is newly opened after the store B is closed down, the device signal fingerprint 21 received from the user device 20 located inside the store A 40 may include BSSIDs of the store A 40, the store C 50, and the store D 60, respectively. Meanwhile, the reference signal fingerprint for the store A 40 stored in the database of the location recognizing apparatus 100 may include the BSSID of the store A 40 and the BSSID of the store C 50 through the above-described update process. Therefore, the location recognizing apparatus 100 may update to add a reference signal fingerprint for the store D 60 to the reference signal fingerprint for the store A 40.

In most cases, the wireless environment is gradually changed over time unless all buildings or stores in a specific area are closed down due to reconstruction. Further, as described above, there are multiple sets (about 50 sets) of signals included in a wireless signal fingerprint received from the inside of a store. Therefore, if there is a change in a store adjacent to a specific store, about 1 to 4 of signal sets included in a device signal fingerprint received from a user device visiting the store are changed. However, even if about 1 to 4 of 50 signal sets are changed, a value of similarity is gradually decreased, and the user device can still be determined as located inside the store with relative high accuracy (i.e., a similarity is still higher than a reference value). Therefore, according to an embodiment of the present disclosure, as for a BSSID and its RSS which do not affect store inside recognition but are commonly different between device signal fingerprints for multiple user devices (user devices greater in number than a predetermined number) recognized as being inside the store and a reference signal fingerprint previously stored in the database, the reference signal fingerprint is updated with the device signal fingerprints. Thus, the user does not need to visit the store in person to recognize a change in the store and recollect a device signal fingerprint.

Figure 13:
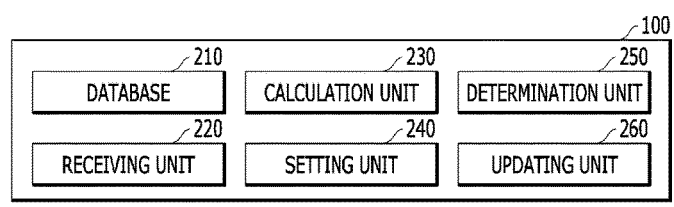
FIG. 13 is a diagram illustrating a configuration of a location recognizing apparatus according to another embodiment of the present disclosure.

FIG. 13 is a diagram illustrating a configuration of a location recognizing apparatus according to another embodiment of the present disclosure.

Referring to FIG. 13, the location recognizing apparatus 100 may include a database 210, a receiving unit 220, a calculation unit 230, a setting unit 240, a determination unit 250, and an updating unit 260.

The databased unit 210 may store a visit recognition pattern for a store and a reference signal fingerprint for the store. For example, the visit recognition pattern may include a first similarity between a device signal fingerprint corresponding to the case where a user device is recognized as being inside the store and the reference signal fingerprint. Further, the visit recognition pattern may include daily visit count information corresponding to the case where the user device is recognized as being inside the store for a day.

The receiving unit 220 may receive device signal fingerprints from multiple user devices and receive a reference signal fingerprint from a signal fingerprint measurement device.

The calculation unit 230 may calculate similarities between the reference signal fingerprint 11 and the multiple device signal fingerprints 21. Further, the calculation unit 230 may calculate the device signal fingerprints 21 and reference signal fingerprints for the respective multiple stores. For example, the calculation unit 230 may calculate a similarity using Equation 1. Equation 1 has been explained above, and, thus, redundant explanation thereof will be omitted.

Further, the calculation unit 230 calculates the similarity on the basis of whether BSSIDs included in the reference signal fingerprint and the device signal fingerprint are superimposed with each other, and if a BSSID is included in only one of the reference signal fingerprint and the device signal fingerprint, an RSS with a minimum value in association with the BSSID may be assigned to the other to calculate a similarity.

The determination unit 250 may determine whether each of the multiple user devices is located inside the store on the basis of the similarity. In this case, the determination unit 250 may determine whether the user device 20 is located inside or outside the store by comparing the similarity with a reference value set by the setting unit 240. For example, if the similarity is equal to or higher than the reference value when the determination unit 250 compares the similarity with the reference value, the determination unit 250 may determine that the user device 20 is located inside the store.

The setting unit 240 may set a reference value for determining the inside or the outside of the store. For example, the setting unit 240 may set reference values for respective multiple stores on the basis of the reference signal fingerprints for the respective multiple stores.

The updating unit 260 may update a reference signal fingerprint for the store on the basis of a calculation result of the similarities between the reference signal fingerprint 11 and the multiple device signal fingerprints 21. For example, if the number of times that the similarities between the reference signal fingerprint and the multiple device signal fingerprints are lower than the first similarity exceeds a predetermined value, the updating unit 260 may recollect a reference signal fingerprint for the store.

Further, in the case where a difference between a store inside recognition count determined on the basis of a calculation result of the similarities and the daily visit count exceeds a predetermined value, the updating unit 260 may recollect a reference signal fingerprint for the store.

Furthermore, the updating unit 260 may compare a BSSID of a device signal fingerprint for at least one user device recognized as being inside the store among the multiple user devices with a BSSID of the reference signal fingerprint and update a non-superimposed BSSID of the reference signal fingerprint with the BSSID of the device signal fingerprint for the at least one user device.

Also, the updating unit 260 may add a BSSID which is not included in the reference signal fingerprint but included in the device signal fingerprint for the at least one user device to the reference signal fingerprint or delete a BSSID which is included in the reference signal fingerprint but not included in the device signal fingerprint for the at least one user device from the reference signal fingerprint.

In an example of setting a reference value by the setting unit 240, the setting unit 240 may set a reference value on the basis of the RSS included in the device signal fingerprint 21 and the RSS included in the reference signal fingerprint 11. The setting unit 240 may set a reference value using Equation 3. Equation 3 has been explained above, and, thus, redundant explanation thereof will be omitted.

Figure 14:
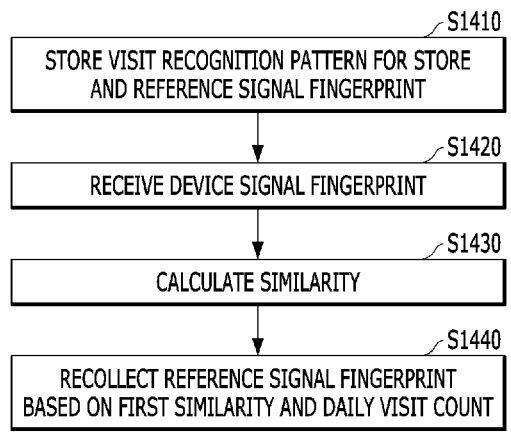
FIG. 14 is a flowchart showing an example of updating store information according to an embodiment of the present disclosure.
Figure 15:
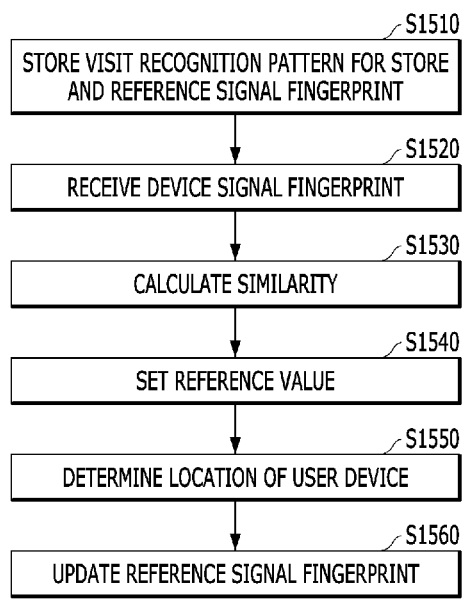
FIG. 15 is a flowchart showing another example of updating store information according to an embodiment of the present disclosure.

FIG. 14 is a flowchart showing an example of updating store information according to an embodiment of the present disclosure, and FIG. 15 is a flowchart showing another example of updating store information according to an embodiment of the present disclosure.

The method of updating store information illustrated in FIG. 14 and FIG. 15 is performed by the location recognizing apparatus 100 described above with reference to FIG. 1 to FIG. 13. Therefore, descriptions of the location recognizing apparatus 100 illustrated in FIG. 1 to FIG. 13 may be identically applied to FIG. 14 and FIG. 15, even though they are omitted hereinafter.

Referring to FIG. 14, the database 210 may store a visit recognition pattern for a store and a reference signal fingerprint for the store in S1410. For example, the visit recognition pattern may include a first similarity between a device signal fingerprint corresponding to the case where a user device is recognized as being inside the store and the reference signal fingerprint. Further, the visit recognition pattern may include daily visit count information corresponding to the case where the user device is recognized as being inside the store for a day.

In S1420, the receiving unit 220 may receive device signal fingerprints from multiple user devices.

In S1430, the calculation unit 230 may calculate similarities between the reference signal fingerprint and the multiple device signal fingerprints.

In S1440, the updating unit 260 may update a reference signal fingerprint for the store on the basis of a calculation result of the similarities between the reference signal fingerprint and the multiple device signal fingerprints. For example, if the number of times that the similarities between the reference signal fingerprint and the multiple device signal fingerprints are lower than the first similarity exceeds a predetermined value, the updating unit 260 may recollect a reference signal fingerprint for the store. Further, in the case where a difference between a store inside recognition count determined on the basis of a calculation result of the similarities and the daily visit count exceeds a predetermined value, the updating unit 260 may recollect a reference signal fingerprint for the store.

Referring to FIG. 15, the database 210 may store a visit recognition pattern for a store and a reference signal fingerprint for the store in S1510.

In S1520, the receiving unit 220 may receive device signal fingerprints from multiple user devices and receive.

In S1530, the calculation unit 230 may calculate similarities between the reference signal fingerprint and the multiple device signal fingerprints.

In S1540, the setting unit 240 may set a reference value for determining the inside or the outside of the store.

In S1550, the determination unit 250 may determine whether the user device 20 is located inside or outside the store on the basis of a result of comparison between the similarity and a reference value. For example, if the similarity is equal to or higher than the reference value when the determination unit 250 compares the similarity with the reference value, the determination unit 250 may determine that the user device 20 is located inside the store.

In S1560, the updating unit 260 may update a reference signal fingerprint for the store. For example, the updating unit 260 may compare a BSSID of a device signal fingerprint for at least one user device recognized as being inside the store among the multiple user devices with a BSSID of the reference signal fingerprint and update a non-superimposed BSSID of the reference signal fingerprint with the BSSID of the device signal fingerprint for the at least one user device.

Also, the updating unit 260 may add a BSSID which is not included in the reference signal fingerprint but included in the device signal fingerprint for the at least one user device to the reference signal fingerprint or delete a BSSID which is included in the reference signal fingerprint but not included in the device signal fingerprint for the at least one user device from the reference signal fingerprint.

It can be understood that the sequence of the processes shown in the flowcharts of FIG. 14 and FIG. 15 may be changed if necessary and at least two processes may be performed simultaneously.

The method of recognizing a location of a user device according to an embodiment of the present disclosure may be implemented in the form of a program command that can be performed through various computer components, and may be recorded on a computer-readable storage medium. The computer-readable storage medium may include a program command, a data file, and a data structure individually or a combination thereof. The program command recorded in the medium may be specially designed and configured for the present disclosure, or may be known to those skilled in a computer software field to be used. Examples of the computer-readable storage medium include magnetic media such as a hard disk, a floppy disk, and a magnetic tape, optical media such as a CD-ROM and a DVD, magneto-optical media such as a floptical disk, and a hardware device such as a ROM, a RAM, and a flash memory, that are specially configured to store and perform program commands. Examples of the program commands may include a machine code generated by a compiler and a high-level language code that can be executed in a computer using an interpreter. The hardware device may be configured as at least one software-module in order to perform the operations of the present disclosure, and vice versa.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A method of recognizing a location of a user device, comprising:
   receiving a device signal fingerprint from the user device;
   calculating similarities between the device signal fingerprint and reference signal fingerprints collected inside a store and stored in a database in association with store information;
   setting a reference value for determining the inside or the outside of the store; and
   determining whether the user device is located inside or outside the store on the basis of the similarities, wherein the similarity and the reference value are compared and if the similarity is equal to or higher than the reference value, the user device is determined as being inside the store.

2. The method of recognizing a location of claim 1, wherein the reference signal fingerprints are stored in the database for respective multiple stores, and
   in the setting of the reference value,
   reference values for the respective multiple stores are set on the basis of the reference signal fingerprints for the respective multiple stores.

3. The method of recognizing a location of claim 2, wherein in the calculating of the similarity, similarities between the device signal fingerprint and the reference signal fingerprints for the respective multiple stores are calculated.

4. The method of recognizing a location of claim 3, wherein the determining includes:
   comparing a first similarity which is the highest similarity among the similarities between the device signal fingerprint and the reference signal fingerprints for the respective multiple stores with a reference value for a first store associated with a reference signal fingerprint corresponding to the first similarity; and
   determining the user device as being inside the first store if the first similarity is equal to or higher than the reference value for the first store.

5. The method of recognizing a location of claim 3, wherein the determining includes:
   determining whether the similarities between the device signal fingerprint and the reference signal fingerprints for the respective multiple stores are equal to or higher than the reference values for the respective multiple stores; and
   determining the user device as being inside a first store associated with a reference signal fingerprint corresponding to a first similarity which is the highest similarity among similarities equal to or higher than the reference values for the respective multiple stores.

6. The method of recognizing a location of claim 1, wherein the device signal fingerprint includes at least one set of a basic service set identifier (BSSID) of an access point adjacent to the user device and information about a wireless signal strength between the user device and the access point, and
   the reference signal fingerprint includes at least one set of a BSSID of an access point adjacent to the store and information about a wireless signal strength between the store and the access point.

7. The method of recognizing a location of claim 6, wherein in the setting of the reference value,
   the reference value is set on the basis of the wireless signal strength included in the device signal fingerprint and the wireless signal strength included in the reference signal fingerprint.

8. The method of recognizing a location of claim 6, wherein in the calculating of the similarity,
   the similarity is calculated on the basis of whether BSSIDs included in the reference signal fingerprint and the device signal fingerprint are superimposed with each other, and if a BSSID is included in only one of the reference signal fingerprint and the device signal fingerprint, a wireless signal strength with a minimum value in association with the BSSID is assigned to the other to calculate a similarity.

9. The method of recognizing a location of claim 1, wherein the setting of the reference value includes:
   receiving an internal signal fingerprint collected from a region inside the store;
   receiving an external signal fingerprint collected from a region outside the store;
   calculating an internal similarity between the device signal fingerprint and the internal signal fingerprint;
   calculating an external similarity between the device signal fingerprint and the external signal fingerprint; and
   setting any one of inter-values between the internal similarity and the external similarity as the reference value.

10. The method of recognizing a location of claim 1, further comprising:
    recording a similarity between a reference signal fingerprint and a device signal fingerprint which corresponds to the case where the user device is determined as being inside the store in the database,
    wherein in the setting of the reference value, top n number of similarities among similarities recorded in the database are averaged and the reference value is set in consideration of the average of the similarities and a store characteristic coefficient.

11. An apparatus of recognizing a location of a user device, comprising:
    a receiving unit configured to receive a device signal fingerprint from the user device;
    a database configured to store reference signal fingerprints collected inside a store in association with store information;
    a calculation unit configured to calculate similarities between the device signal fingerprint and the reference signal fingerprints;
    a determination unit configured to determine whether the user device is located inside or outside the store on the basis of the similarities; and
    a setting unit configured to set a reference value for determining the inside or the outside of the store, wherein the determination unit compares the similarity and the reference value and if the similarity is equal to or higher than the reference value, the determination unit determines that the user device is inside the store.

12. The apparatus of recognizing a location of claim 11, wherein the reference signal fingerprints are stored in the database for respective multiple stores, and
    the setting unit sets reference values for the respective multiple stores on the basis of the reference signal fingerprints for the respective multiple stores.

13. The apparatus of recognizing a location of claim 12,
wherein the calculation unit calculates similarities between the device signal fingerprint and the reference signal fingerprints for the respective multiple stores, and
the determination unit compares a first similarity which is the highest similarity among the similarities between the device signal fingerprint and the reference signal fingerprints for the respective multiple stores with a reference value for a first store associated with a reference signal fingerprint corresponding to the first similarity, and
determines the user device as being inside the first store if the first similarity is equal to or higher than the reference value for the first store.

14. The apparatus of recognizing a location of claim 12,
wherein the calculation unit compares similarities between the device signal fingerprint and the reference signal fingerprints for the respective multiple stores, and
the determination unit determines whether the similarities between the device signal fingerprint and the reference signal fingerprints for the respective multiple stores are equal to or higher than the reference values for the respective multiple stores, and
determines the user device as being inside a first store associated with a reference signal fingerprint corresponding to a first similarity which is the highest similarity among similarities equal to or higher than the reference values for the respective multiple stores.

15. The apparatus of recognizing a location of claim 11,
wherein the device signal fingerprint includes at least one set of a basic service set identifier (BSSID) of an access point adjacent to the user device and information about a wireless signal strength between the user device and the access point, and
the reference signal fingerprint includes at least one set of a BSSID of an access point adjacent to the store and information about a wireless signal strength between the store and the access point, and
the setting unit sets the reference value on the basis of the wireless signal strength included in the device signal fingerprint and the wireless signal strength included in the reference signal fingerprint.

16. The apparatus of recognizing a location of claim 11,
wherein the receiving unit receives an internal signal fingerprint collected from a region inside the store and receives an external signal fingerprint collected from a region outside the store,
the calculation unit calculates an internal similarity between the device signal fingerprint and the internal signal fingerprint and an external similarity between the device signal fingerprint and the external signal fingerprint, and
the setting unit sets any one of inter-values between the internal similarity and the external similarity as the reference value.

* * * * *